UNITED STATES PATENT OFFICE.

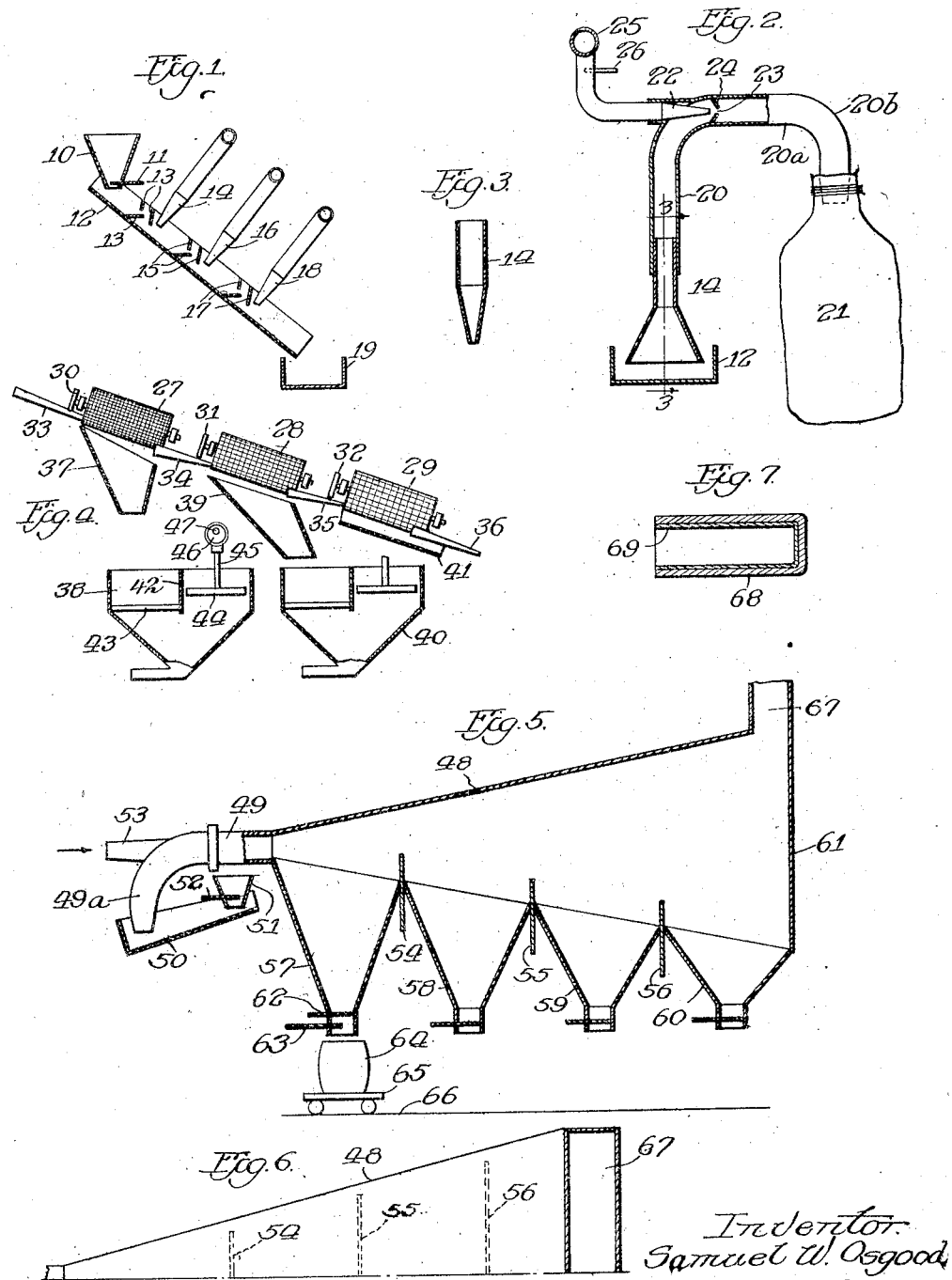

SAMUEL W. OSGOOD, OF CHICAGO, ILLINOIS, ASSIGNOR, BY MESNE ASSIGNMENTS, TO NETTIE C. KENNER, OF CHICAGO, ILLINOIS.

PROCESS FOR PRODUCING FLAKE GRAPHITE.

1,328,845.   Specification of Letters Patent.   Patented Jan. 27, 1920.

Application filed March 4, 1916. Serial No. 82,044.

*To all whom it may concern:*

Be it known that I, SAMUEL W. OSGOOD, a citizen of the United States, residing at Chicago, in the county of Cook and State of Illinois, have invented a certain new and useful Improvement in Processes for Producing Flake Graphite, of which the following is a specification.

My invention relates to an improved process for producing flake graphite from the refuse constituting a waste product in connection with the manufacture of iron and steel. This waste product may result from the manufacture of cast iron, or from the manufacture of steel from the cast iron, as for example in the open hearth furnace. In the first case, the waste product is found in the ladle after pouring and consists of a small amount of molten iron retained in the ladle mixed with flakes of graphite, small bits of brick, clay and more or less dirt which is cleaned out of the ladle after a pouring operation before the ladle is again used. The graphite or graphitic carbon contained in the cast iron is held in suspension in fluid form in the iron in the blast furnace and when the iron is drawn off into the ladles a considerable quantity of the graphite crystallizes out of the solution, the amount depending somewhat on the distance the ladle is carried before the pouring operation and these crystals together with the residue of the molten iron in the ladle, chunks of brick from the lining of the furnace and clay from the lining of the furnace and ladles constitute the bulk of the waste material under consideration, which also contains a small amount of coke. A similar waste product results from the subsequent treatment of pig iron in the open hearth furnace and results from scraping the residue or waste material from the furnace after treating a batch of metal therein.

Heretofore, in the art this waste material has been disposed of by scraping it into a tank filled with water and in this tank there is preferably located under the water an iron car for receiving the refuse scraped into the tank. The car is then removed from the tank by means of a cable on an inclined track and, if it is not desired to recover the iron contained in the refuse, the car is taken to the dump-pile where the refuse matter is deposited.

It is well known in the art that flake carbon is a valuable product capable of many uses, such for example as for fire-proofing shingles, roofing-paper, or in fact any material used either for roofing purposes or otherwise in a building, for fire brick, for crucible or other containers for heat-resisting purposes, for foundry facings, for the manufacture of carbon dry batteries, for brushes and carbons for other electrical purposes, for lubricating purposes and for making crayons and pencils.

The amount of this waste product in large plants is considerable and its disposition heretofore has been a problem on account of the graphite flakes either floating in the air and becoming a nuisance in surrounding territory or, when the refuse is thrown into streams the flakes float on the surface and cause damage. Furthermore, when the refuse is dropped into the tank of water referred to much of the graphite is washed from the iron pellets and a large proportion is washed away in this manner so that it does not lodge in the car. The water of the tank is then drawn off suddenly and into a second tank somewhat below the first tank with the result that most of the lighter graphite and pieces of coke and brick are drawn into the second or settling tank. The iron pellets which are in the tank may be recovered and these pellets and iron masses may be again fed with the ore into the blast furnace charge. Frequently successive settling tanks are employed so as to be sure to catch all of the flaky particles before delivering the settling water to the streams into which it is sent. It is usual to remove the settled material from the tanks every few weeks during the operation of the plant and by suitable cars it is taken to the dump-pile and deposited or mixed with other refuse material from the plant and used for road beds or disposed of in some other way as waste material. The waste material from the settling tank consists of fine coke particles, iron in finely divided condition and small pieces of fire brick and fire clay, and flake graphite.

My process consists essentially in treating the waste material from the settling tank in successive steps so as to separate the graphite particles from the remainder of the waste material. The first step is a roughening operation by which two products result, one being nearly all graphite and the other containing nearly all of the other substances of the waste material and a small amount of graphite. This roughing operation may be performed with the material either wet or dry as will be described. The second step in my process consists in removing from the separated graphite product of the first step the iron particles which may preferably be done by means of an electromagnet, and then treating the remaining graphite product with chemicals as for example chlorin and washing to remove the remaining iron compounds or, if preferred, the iron may be removed in any other desired manner. If the graphite is to be used for lubricating purposes, the graphite resulting from the second step of my process may be dried and incinerated at low heat in an electric furnace or otherwise so that the coke will be burned out without, however, incinerating the graphite. After the coke has been thus removed the resulting graphite may be fused with alkali or sodium carbonate to remove the silica, and the resulting product is then washed with warm water till all the gritty silica has been removed, with the result that a good grade of lubricating graphite is produced. If desired, the grit may be removed by other suitable means. Whether the graphite product is chemically treated to remove the iron and silica or not, it is next dried in a drying oven to accomplish which in a thorough manner it is preferable that a continuous dryer should be employed, that is to say, one in which the material may be continuously fed into one end of the oven and by suitable traveling conveyers delivered from some other portion of the oven. After drying and cooling the graphite flakes may be properly sized dry by means of grated shaking screens having preferably large screen area so that clean sizing is had, and this is particularly desirable if the graphite product has not been treated to remove the coke and silica. The graphite resulting from the sizing without the removal of the coke and silica is useful for fire-resisting paint, for crucible construction and for fire-resisting covering for building material, etc. To get the best results from the screening and sizing operations it is desirable to repeatedly screen the same until all of the gritty substances are removed. The sized graphite grains are now conveyed to separate hoppers or bins so that each size may be kept by itself, and each size is separately graded preferably by air flotation so as to separate the lighter from the heavier particles and by this step graded sizes or weights of particles may be secured between the lightest and the heaviest particles.

My process may be carried out either by treating the product wholly in dry condition or wholly while the product is in wet condition or combinations of the dry and wet methods may be used if desired and, it will be understood, that it is not necessary to remove iron, coke and silica, or any of them, unless it is necessary to produce a pure graphite product and then my invention is realized by the use of the remaining steps of the process whether these particular operations are performed or not. Furthermore, it is not necessary that the particular steps described shall be performed in a particular sequence, since my invention consists broadly in producing commercial graphite flakes from the products of crystallization resulting from molten iron or steel.

In carrying out my invention I may employ apparatus as shown in the accompanying drawings, in which—

Figure 1 is a diagrammatic view in vertical section of a mechanism for effecting the rough separation referred to with the material in dry condition, Fig. 2 is a detail view of one of the suction pipes employed in connection with the apparatus shown in Fig. 1, Fig. 3 is a vertical sectional view taken along the line 3—3 of the suction nozzle employed in Fig. 2, Fig. 4 is a diagrammatic drawing of screening and jigging apparatus which may be employed for rough separation of the material with the latter in wet condition, Fig. 5 is a vertical sectional view taken longitudinally through apparatus that may be used for grading the flakes, Fig. 6 shows in plan view one-half of the grading chamber shown in Fig. 5, and Fig. 7 is a longitudinal sectional view of an improved retort constructed according to my invention.

Similar numerals refer to similar parts throughout the several views.

In carrying out the roughing operation above referred to with the product in dry condition the apparatus shown in Fig. 1 may be employed which consists of a hopper 10 into which the dry refuse is deposited, which hopper is provided with a gate 11 at its lower end for delivering the material to the upper end of a trough 12 at a desired rate. The trough 12 is inclined so that the material will pass downward through it over and under the baffle-plates 13 which cause a stream of uniform depth of material to pass below the lower end of the nozzle 14 from which the remaining material passes over and under a second set of baffle-plates 15 controlling the flow of the stream of material under the nozzle 16 after which the material passes over and under the baffle-plates 17 which control the flow of the stream of material under the nozzle 18 the remaining material being delivered from the lower end of the trough 12 into a chute 19 for conveying said remaining material away from the apparatus. There may be as many of the suction nozzles 14, 16 and 18 as desired and any desired arrangement of the baffle plates. The suction nozzles are similar in construction so that a description of but one of them is necessary, for example the nozzle 14. As shown more clearly in Figs. 2 and 3, the nozzle 14 is mounted in the lower end of a pipe 20 so that the nozzle may be slid vertically to secure any desired distance between its lower end and the trough 12. The lower end of the nozzle 14 is preferably narrow lengthwise of the trough and long enough to nearly fill the latter, as a result of which the suction exerted by the nozzle is brought to bear upon practically all of the material passing through the trough. The upper end of the vertically-extending pipe 20 is bent into a horizontal plane as indicated at 20$^a$ and continued and bent into a vertical downwardly-extending portion 20$^b$ to the lower end of which the receiving bag 21 is secured. At the bend between the portions 20 and 20$^a$ an air nozzle 22 is mounted for projecting air under pressure through the restricted aperture 23 formed in the conical diaphragm 24. The air nozzle 22 is connected with an air main 25 for supplying air under pressure to said nozzle the flow of air being controlled by a sliding gate 26 between the air main and the air nozzle. When the gate is drawn out the action of the air passing rapidly from the nozzle 22 through the diaphragm 24 produces suction in the pipe 20 with the result that the lighter particles contained in the material passing down the trough 12 are sucked into the nozzle 14 and projected by means of the air current flowing through the pipe 20 into the bag 21. By proper regulation of the nozzles 14, 16 and 18 the light particles, mostly graphite, which are removed by the nozzles may be roughly sized or classified and a sufficient number of nozzles is employed so that the remaining material delivered from the lower end of the trough contains little, if any, graphite.

When it is desired to separate the graphite from the remaining material by the wet method it may be accomplished by the apparatus shown in Fig. 4 in which the material as a whole may be roughly sorted or classified by means of the cylindrical screens 27, 28 and 29 mounted to rotate in suitable bearings as indicated and provided with driving pulleys 30, 31 and 32 for rotating said screens. A spout 33 is provided for delivering the original material into the upper end of the screen 27, a spout 34 is provided for conveying the material delivered from the lower end of the screen 27 into the upper end of the screen 28, a spout 35 is provided for delivering the material from the lower end of the screen 28 into the upper end of the screen 29 and a spout 36 is provided for delivering the waste material from the lower end of the screen 29 to any desired receptacle. The screens 27, 28 and 29 are preferably graded and may be of fine, medium and coarse mesh respectively so as to deliver from the screens fine, medium and coarse particles for further treatment. The screen 27 has located beneath it a hopper 37 for directing the material passing through the screen 27 into the first jig 38. The screen 28 has located beneath it a hopper 39 for directing the particles of medium size passing through it into a second jig 40 and the screen 29 has disposed beneath it a trough 41 for receiving the coarser particles passing through said screen and delivering them, if desired, to another jig not shown. The jigs may be of any type known in metallurgical operations and are used to separate the lighter particles from the heavier by the agitation of the water in the jig. The jigs used may all be of one type or a combination of different types as desired. The jigs shown are similar and therefore a detailed description of but one is necessary, as for example jig 38, which consists essentially of a casing of V-shaped construction divided into two parts by a partition 42 between the lower edge of which and the left-hand wall a grating 43 is disposed and between which partition and the right-hand wall a plunger 44 is carried by a connecting rod 45 on an eccentric 46 mounted on a rotary shaft 47. In operation the material being treated extends somewhat above the grating 43 and the jig is practically full of water so that rotation of the shaft 47 and vertical reciprocation of the plunger 44 stirs up the material, imparting upward impulses thereto in the left-hand section of the jig which results in the settling of the heavier particles and the rising of the lighter particles in the left-hand compartment, after which the lighter particles are removed from the jig through suitable outlet openings.

The apparatus just described may be employed for separating all of the material to be treated from the larger particles of waste material such as the fire brick and clay which ultimately pass down the chute 36, and the graded screens result in delivering the particles to be treated in graded sizes to the different jigs which serve to separate the lighter graphite particles from the remaining heavier particles in the manner described. If it is desired that the entire process of separation of the graphite from the other particles should be by the wet method, the graphite may be cleaned or concentrated or both and washed by keeves, classifiers, screens, tables, buddles and circular tables or other devices well known in connection with ore dressing and which require no particular description.

In Fig. 5 an apparatus which may be employed for the air flotation of the graphite flakes is shown and consists of a funnel-shaped compartment 48 of rectangular construction at the small end of which an inlet pipe 49 is connected which is bent downward and terminates in a supply trough 50, which trough is fed from a hopper 51 provided near its lower end with a controlling gate 52. The material to be graded is placed in the hopper 51 and permitted to flow into the trough 50 at a proper rate, from which trough it is drawn by suction through the pipe 49ª and projected through the pipe 49 into the compartment 48. The suction necessary to produce this result is secured in substantially the same manner described above in connection with the apparatus shown in Figs. 2 and 3, the compressed air required to accomplish the result being forced into the pipe 49 through the connecting pipe 53. In the lower wall of the compartment 48 is located a series of slide gates 54, 55 and 56, each of which may be moved vertically to any desired position and each of which extends across the compartment. Between the delivery end of the pipe 49 and the gate 54 the upper end of the hopper 57 is connected which extends across the compartment 48. A second hopper 58 communicates at its upper end with the compartment 48 between the gates 54 and 55. A third hopper 59 communicates at its upper end with the compartment 48 between the gates 55 and 56. A fourth hopper 60 communicates at its upper end with the compartment 49 between the gate 56 and the right-hand wall 61 of the compartment. The several hoppers are provided with gates at their lower ends for retaining material in the hoppers and removing the same therefrom as desired. And if desired, each hopper may be provided with a double gate as shown for the hopper 57 in which case the gate 62 is closed to retain the material in the hopper 57 while the gate 63 may be opened to remove the material in the lower part of the hopper into a movable receptacle 64 which may be mounted upon a car 65. A track 66 is provided so that the car may be moved under any one of the hoppers to remove material therefrom. When the gate 63 is closed the gate 62 is opened so as to permit the material in the hopper to rest upon the gate 63. At the right hand end of the compartment 48 an exhaust flue 67 is provided to afford an outlet for the air from the compartment 48 and this flue may be connected with a stack or may be screened with fine screen cloth to catch the very fine dust carried by the air to the right-hand end of the compartment.

In operating the apparatus shown in Fig. 5, the mixed graphite particles are blown into the compartment through the pipe 49, the heaviest ones fall into the hopper 57 and the lighter ones fall progressively into the hoppers 58, 59 and 60, the hopper 60 receiving the lightest of these particles. Since the lighter particles of graphite tend to remain suspended in the air it is desirable to reduce the velocity of the flow of air as the distance increases from the pipe 49, so that it is advantageous to increase the width of the compartment as well as its height as the distance from the pipe 49 increases. The adjustable slide gates 54, 55 and 56 afford a means for changing the dividing line between the different sizes of particles caught by the several hoppers, so that the resulting product may be graded to a nicety.

One of the important results of my invention is the production of the flake graphite so cheaply that it is now made possible to use it commercially for purposes for which it has not heretofore been used, as for example for protecting roofing material of any kind, the roofing paper and fiber board and large retorts such as are employed for zinc smelting.

In the claims, I refer to the waste material forming the raw material treated by my process as kish, meaning thereby the mixture of graphite scale and other substances such as slag, iron oxid, and fragments of iron, cinders, brick and fire clay accumulating from the cooling of molten iron surcharged with carbon.

The composition of said kish varies under different conditions and it may contain in addition to said graphite scale any or all of the other substances mentioned in varying proportions depending upon the manner of treating the iron in melting it and the manner of treating and handling the waste material resulting from the treatment of the iron.

What I claim is:

1. The process of obtaining flake graphite consisting in subjecting kish to a rough-separating operation, thereby separating most of the graphite flakes from said kish, removing the iron particles from the resulting graphite flakes, removing the gritty material from the resulting graphite flakes, and grading the graphite flakes by air flotation.

2. The process of obtaining flake graphite consisting in subjecting kish to a rough-separating operation, thereby separating most of the graphite flakes from said kish, removing the iron particles from the resulting graphite flakes, removing the gritty material from the resulting graphite flakes, and grading the graphite flakes.

3. The process of obtaining flake graphite consisting in subjecting kish to a rough-separating operation, thereby separating most of the graphite flakes from said kish, removing the iron particles from the resulting graphite flakes, and grading the graphite flakes.

4. The process of obtaining flake graphite consisting in subjecting kish to a rough-separating operation, thereby separating most of the graphite flakes from said kish, and grading the graphite flakes.

5. The process of obtaining flake graphite consisting in subjecting kish to a rough-separating operation, thereby separating most of the graphite flakes from said kish, removing the iron particles from the resulting graphite flakes, and grading the graphite flakes by air flotation.

6. The process of obtaining flake graphite consisting in subjecting kish to a rough-separating operation, thereby separating most of the graphite flakes from said kish, removing the gritty material from the resulting graphite flakes, and grading the graphite flakes by air flotation.

7. The process of obtaining flake graphite consisting in subjecting kish to a rough-separating operation, thereby separating most of the graphite flakes from said kish and grading the graphite flakes by air flotation.

8. The process of obtaining flake graphite consisting in separating the graphite particles from kish and collecting the graphite particles.

9. The process of obtaining flake graphite consisting in separating the graphite particles from kish and collecting the graphite particles, and grading the resultant graphite particles into different sizes.

10. The process of obtaining flake graphite consisting in subjecting kish to a rough-separating operation, thereby separating in dry condition most of the graphite flakes from said kish, removing the iron particles from the resulting graphite flakes, removing the gritty material from the resulting graphite flakes, and grading the graphite flakes by air flotation.

11. The process of obtaining flake graphite consisting in subjecting kish to a rough-separating operation, thereby separating in dry condition most of the graphite flakes from said kish, removing the iron particles from the resulting graphite flakes, removing the gritty material from the resulting graphite flakes, and grading the graphite flakes.

12. The process of obtaining flake graphite consisting in subjecting kish to a rough-separating operation, thereby separating in dry condition most of the graphite flakes from said kish, and grading the graphite flakes.

13. The process of obtaining flake graphite consisting in subjecting kish to a rough-separating operation, thereby separating in dry condition most of the graphite flakes from said kish, and grading the graphite flakes by air flotation.

14. The process of obtaining graphite, consisting in subjecting kish to a separating operation thereby separating most of the graphite from said kish and treating the graphitic product with chemicals to eliminate impurities therefrom.

15. The process of obtaining graphite, consisting in subjecting kish to a separating operation thereby separating most of the graphite from said kish and eliminating iron from the graphitic product by magnetic separation.

16. The process of obtaining graphite, consisting in subjecting kish to a separating operation thereby separating most of the graphite from said kish and incinerating the graphitic product at a temperature lower than the incinerating temperature of graphite.

17. The process of obtaining graphite, consisting in subjecting kish to a separating operation thereby separating most of the graphite from said kish and converting the insoluble silica salts contained in the graphitic product into soluble silica salts.

18. The process of obtaining graphite, consisting in subjecting kish to a separating operation thereby separating most of the graphite from said kish, incinerating the graphitic product at a temperature lower than the incinerating temperature of graphite, and converting the insoluble silica salts contained in the graphitic product into soluble silica salts.

19. The process of obtaining graphite, consisting in subjecting kish to a separating operation thereby separating most of the graphite from said kish and treating the graphitic product with an iron solvent.

20. The process of obtaining graphite, consisting in subjecting kish to a separating operation thereby separating most of the graphite from said kish, eliminating iron from the graphitic product by magnetic separation, and treating the graphitic product with an iron solvent.

21. The process of obtaining graphite, consisting in subjecting kish to a separating operation thereby separating most of the graphite from said kish, eliminating iron from the graphitic product by magnetic separation, and incinerating the graphitic product at a temperature lower than the incinerating temperature of graphite.

22. The process of obtaining graphite, consisting in subjecting kish to a separating operation thereby separating most of the graphite from said kish, eliminating iron from the graphitic product by magnetic separation, incinerating the graphitic product at a temperature lower than the incinerating temperature of graphite, and converting the insoluble silica salts contained in the graphitic product into soluble silica salts.

23. The process of obtaining graphite, consisting in subjecting kish to a separating operation thereby separating most of the graphite from said kish, eliminating iron from the graphitic product by magnetic separation, treating the graphitic product with an iron solvent, incinerating the graphitic product at a temperature lower than the incinerating temperature of graphite, and converting the insoluble silica salts contained in the graphitic product into soluble silica salts.

24. The process of obtaining flake graphite consisting in separating the graphite particles from kish, removing the impurities from the graphite particles and collecting the graphite particles.

25. The method of obtaining marketable graphitic carbon from the waste product known as graphite scale, consisting in separating and removing the foreign matter by mechanical separative means leaving the graphitic carbon as a residue.

26. The method of obtaining graphite from dry artificial graphite scale, which consists in subjecting the said scale to the action of an air separator.

27. The method of obtaining graphite from dry artificial graphite scale, which consists in subjecting it to the action of an air separator and screening.

28. The method of obtaining graphite from dry artificial graphite scale, which consists in subjecting the scale to the action of an air separator, screening and subjecting the residue to the action of an electro-magnetic separator.

29. The method of obtaining graphite from dry artificial graphite scale which consists in subjecting said scale to the operation of screening and then subjecting the product thus obtained to the action of an air separator.

In witness whereof, I hereunto subscribe my name this 26th day of February A. D. 1916.

SAMUEL W. OSGOOD.